United States Patent Office.

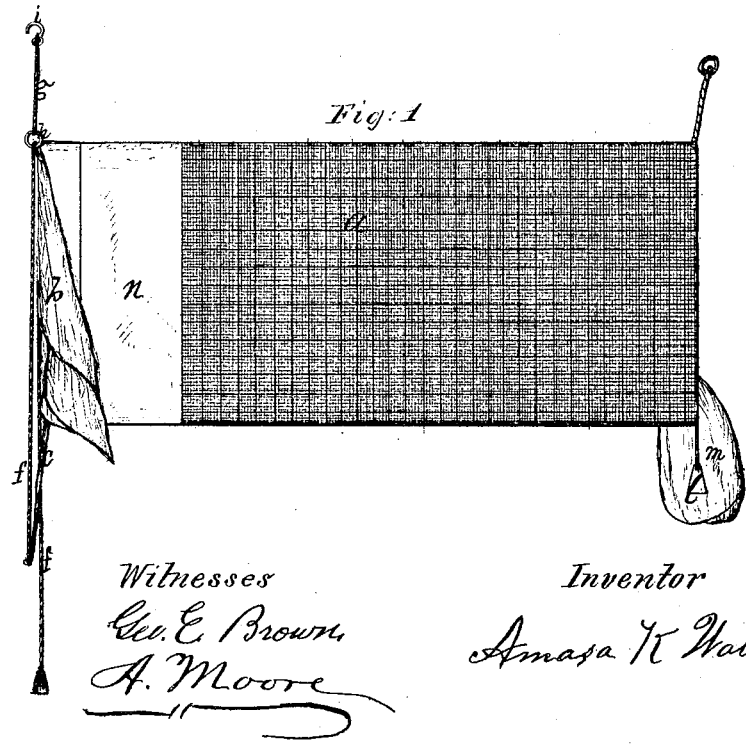
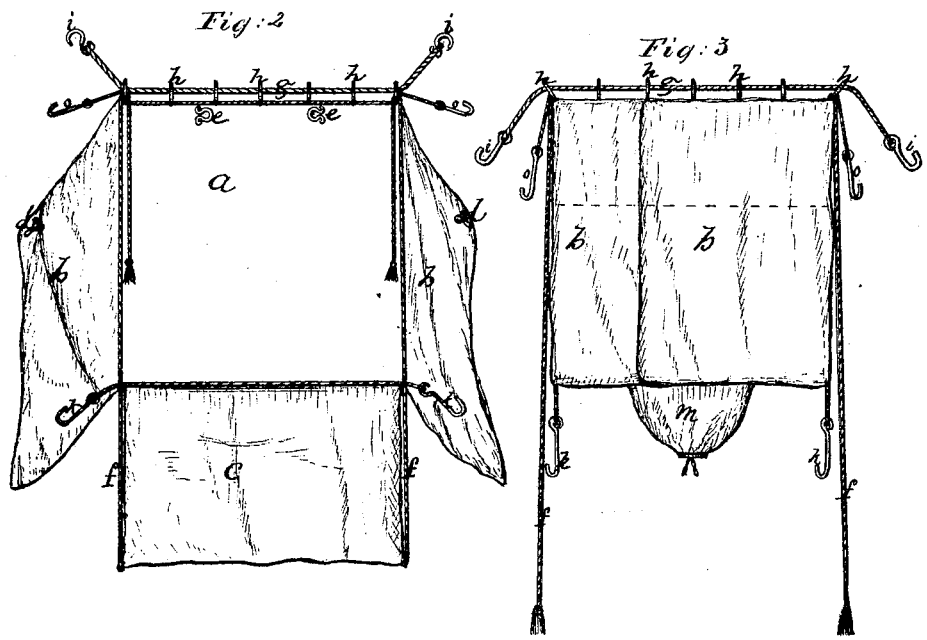

AMASA K. WALKER, OF HAMPDEN, MAINE.

Letters Patent No. 111,497, dated January 31, 1871.

IMPROVEMENT IN FLY-EXTERMINATORS.

The Schedule referred to in these Letters Patent and making part of the same.

I, AMASA K. WALKER, of Hampden, Penobscot county, Maine, have invented certain Improvements in Fly-Exterminators, of which the following is a specification.

Figure 1 is a side elevation;

Figure 2 an end elevation, showing the flaps open; and

Figure 3 an end elevation, showing the flaps closed.

This invention relates to a net made in the shape of a bag, oblong or square in cross-section, and provided with flaps at its front end, and with a smaller receptacle at its rear end, the uses of which net, flaps, and receptacle I now proceed to explain.

Referring to the drawing—

$a$ is the net, a very suitable material for which is the coarse muslin used for making mosquito-bars, said net being, at its front end, provided with side flaps $b$ and a bottom flap, $c$, the side flaps having hooks $d$, by which, when folded over the mouth of the net, they may be fastened thereto by eyes $e$, and the bottom flap being furnished with cords $f$ by which it may be drawn up over the mouth of the net.

Rings $h$ are secured to the front of the net, at its upper side, through which rings a cord, $g$, is passed, said cords having hooks, $i$, fastened to its ends, by means of which and of hooks $k$, secured to its lower front corners, and of other hooks secured to its rear upper corners, the net may be suspended in a horizontal position either in a room or just outside the door or window of a room, the lower rear corners being kept in position by weights $l$ hung thereto, and the upper front end being kept stretched by hooks $o$.

When the net is thus suspended the flaps should all be open, the lower flap serving to fill that part of the doorway not occupied by the net, and thus to prevent the escape of flies. The room should then be darkened and the flies therein driven into the net.

It will be found useful to line the inside of the latter near its front end with some white material, as shown at $u$, fig. 1, in order to attract the insects.

After most of the flies in the room have entered the net its flaps should be closed across its mouth, the hooks which suspend it unfastened, and the sides of the net brought together gradually from its front toward its rear end, so as to drive all the flies into the receptacle $m$, which opens into the net. This being done, the receptacle should be dipped in hot water, so as to kill its occupants.

The carcasses are easily removed from the receptacle by opening its lower end, which is provided with a cord for the purpose.

The flaps $b$, though useful, may be dispensed with, the flap $c$ being the only one that is absolutely necessary.

I claim as my invention—

The net $a$, in combination with the flap $c$ and receptacle $m$, as specified.

AMASA K. WALKER.

Witnesses:
GEO. E. BROWN,
JOHN A. PETERS.